March 31, 1959 — J. W. COX — 2,879,696
PULP MOLDING MACHINE
Filed July 10, 1952 — 4 Sheets-Sheet 1

INVENTOR.
John W. Cox,
BY Cromwell, Greist & Warden
ATTYS.

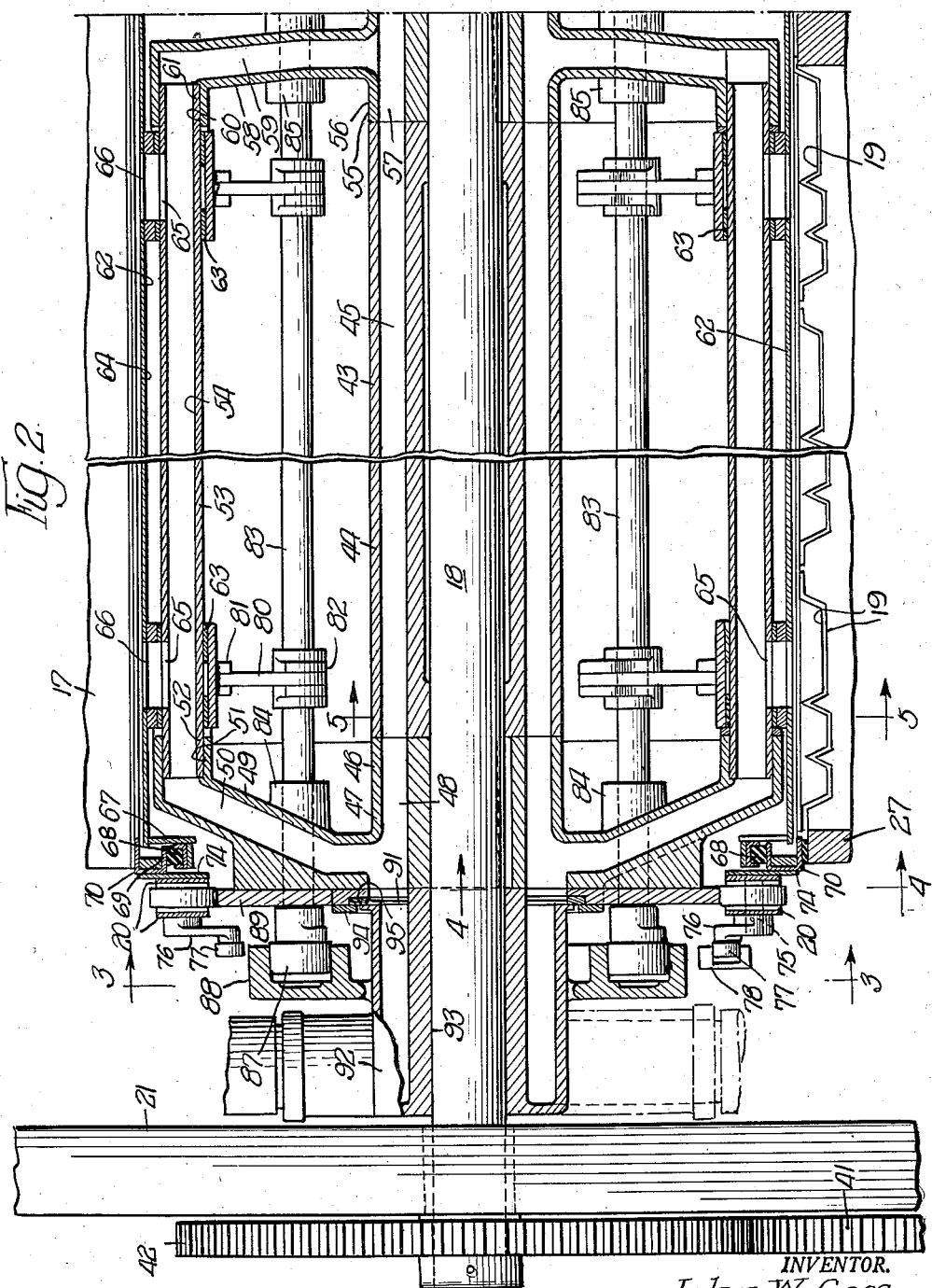

March 31, 1959  J. W. COX  2,879,696
PULP MOLDING MACHINE
Filed July 10, 1952  4 Sheets-Sheet 3
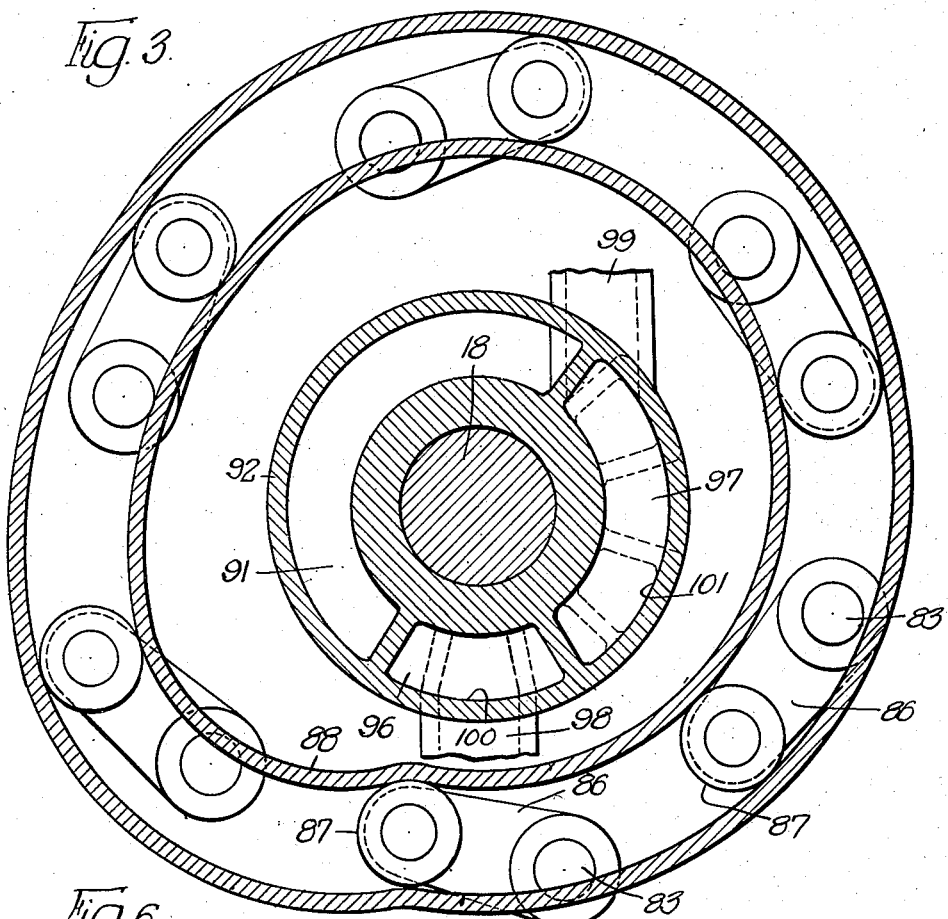
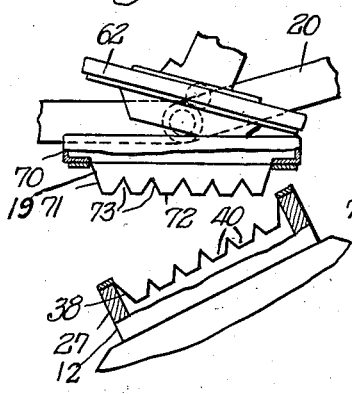
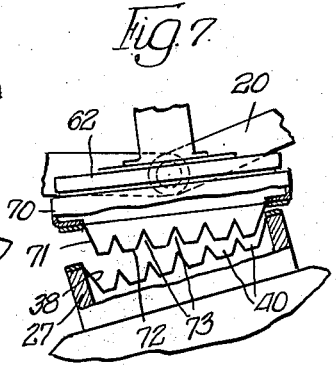
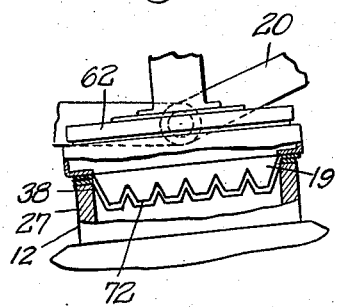
INVENTOR.
John W. Cox,
BY
Cromwell, Greist & Warden
Attys.

March 31, 1959 J. W. COX 2,879,696
PULP MOLDING MACHINE
Filed July 10, 1952 4 Sheets-Sheet 4
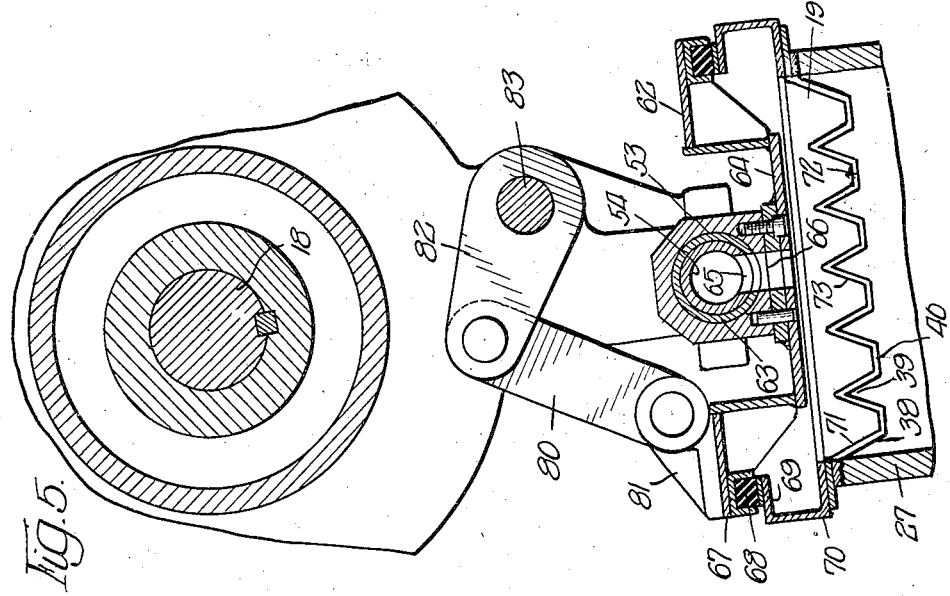
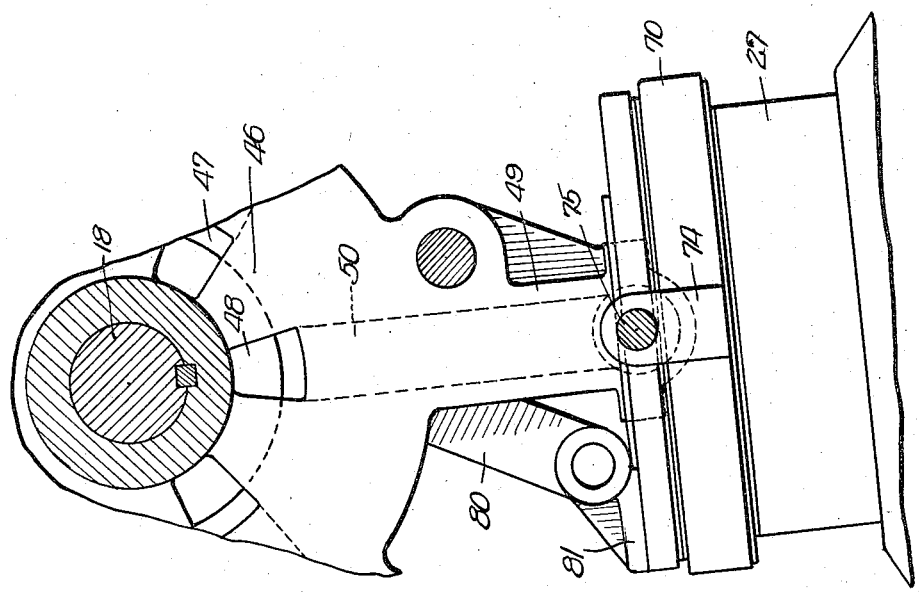
INVENTOR.
John W. Cox,
BY Cromwell, Greist & Warden
Attys.

United States Patent Office

2,879,696
Patented Mar. 31, 1959

2,879,696

PULP MOLDING MACHINE

John W. Cox, Chicago, Ill., assignor, by mesne assignments, to Diamond Gardner Corporation, a corporation of Delaware Application July 10, 1952, Serial No. 298,022

15 Claims. (Cl. 92—56)

This invention relates to a machine for forming molded pulp articles, and is more particularly concerned with improvement in mechanism by means of which a series of molded pulp articles are formed on continuously moving dies and thereafter transferred to a series of continuously moving drying forms complementary in shape to the forming dies which carry the articles through a drying oven.

The mechanism employed for molding pulp articles ordinarily comprises a rotating carrier provided with a series of peripherally spaced foraminous dies, each contoured to provide the desired shape for the article being molded, which dies are moved by rotation of the carrier into a vat filled with a quantity of liquid pulp material and immersed for a sufficient length of time to permit formation thereon of a layer of pulp by means of suction through the dies. Thereafter the soft, wet shaped pulp articles are subjected to drying and finishing operations, in the course of which they are removed from the forming dies. One method of drying commonly employed involves transferring the wet molded articles to shaped drying forms which are mounted on a conveyor and which carry the articles through the drying oven. This method produces a more uniform article and is preferable from many standpoints. However, in practicing this method heretofore difficulty has been experienced in effecting the transfer of the articles from the molding dies to the drying forms in an efficient and rapid manner and without damage to the articles.

It is a general object of the invention to provide in a pulp molding machine of the type which comprises a continuously rotating cylindrical frame on which there is arranged a series of forming dies and a continuously moving endless conveyor on which there is arranged a series of supporting or drying forms, the conveyor being supported at one end adjacent the cylindrical frame, an improved arrangement for transferring the still wet and soft molded articles from the faces of the forming dies to the complementary faces of the supporting or drying forms, which arrangement includes means for controlling the movement of the supporting forms to bring the face of each form into parallelism and alignment with the face of a forming die for a relatively short interval of time sufficient to effect transfer of the molded article, by movement through the space between the opposed contoured faces, from the forming die to the supporting form.

It is a more specific object of the invention to provide in a molding machine of the type described transfer mechanism wherein the supporting or drying forms are pivotally mounted on the conveyor and cam means are associated therewith to pivot the forms as they approach and move away from the path of movement of the forming dies whereby to align the faces of the forms with the faces of the dies during a predetermined curvilinear movement of the same to permit transfer of the articles from the dies to the forms along a line extending substantially on a radius of the rotating die supporting frame.

It is another object of the invention to provide a molding machine comprising a rotatable drum, a series of forming dies arranged in spaced relation around the periphery of the drum, a container arranged below the drum and having a supply of liquid pulp material through which the forming dies travel at the lower portion of their rotative movement to permit a layer of the pulp to be deposited on the molding faces thereof, an endless conveyor, a rotatable sprocket formation arranged above the drum and supporting one end of the conveyor, a series of drying forms pivotally mounted in spaced relation on said conveyor and cam means on the sprocket formation for controlling the pivotal movement of the drying forms as they move bodily around the sprocket formation, the sprocket formation being so located relative to the forming die drum and the cam means being so arranged that successive drying forms and forming dies are aligned with the faces thereof in parallel opposed and spaced relation for a short period of time sufficient to permit transfer of the wet pulp from the forming die to the drying form during continuous rotative movement of the drum and the sprocket formation.

It is a still more specific object of the invention to provide a pulp molding machine comprising a series of molding dies arranged in peripherally spaced relation about a rotatably mounted cylindrical drum, a container having means for maintaining therein a liquid pulp material, the container and drum being so arranged that the molding faces of the dies are immersed in the liquid pulp material during movement in the lower portion of their rotative path, an endless conveyor having one end supported on a sprocket formation rotatably mounted above the die supporting drum, drying forms pivotally mounted on the conveyor and having article receiving faces which are complementary to the molding faces, the drum and sprocket being driven in synchronism to bring successive drying forms into opposed relation with successive forming dies, cam arms associated with the drying forms and a cam track cooperating therewith to rotate the drying forms as they move toward and away from the forming dies whereby to position the opposed complementary faces thereof into parallel aligned relation and permit transfer of the molded article by movement through the space between the opposed faces along a path extending substantially radially of the drum without any contact between the projecting portions of the drying form and the molded article before the transfer or between the projecting portions of the forming die and the article after the transfer whereby the transfer does not result in any scuffing or damage to the article.

It is another object of the invention to provide a molding machine of the type described wherein the drying forms comprise separable compartment formations, one of which is mounted on the conveyor while the other of which is mounted around the periphery of the sprocket formation supporting the end of the conveyor, the compartment formations being hollow to provide a passageway for connection with a suction line and means being provided for tilting the compartment formations relative to the sprocket when they are brought into cooperative engaging relation as the drying form moves around the sprocket formation.

It is still another object of the invention to provide in a molding machine an endless conveyor for supporting a plurality of drying forms, wherein the conveyor is mounted at one end on a sprocket and wherein each of the drying forms comprises a hollow compartment forming portion which is adapted to cooperate with a hollow compartment forming member on the conveyor sprocket to form a suction chamber, the compartment forming member on the sprocket being mounted for pivotal movement relative to the sprocket and cam means is provided for controlling the pivotal movement of the compartment forming members when they are in cooperative suction chamber forming relation.

It is a further object of the invention to provide in a pulp molding apparatus a rotatable cylinder having a forming die thereon adapted to receive on a foraminous molding face thereof a layer of wet pulp forming a molded article and a sprocket driven chain conveyor having a drying form thereon with a face which is complementary to the molded face of the pulp on the forming die, the drying form being pivoted relative to the links on the conveyor chain, the cylinder and the conveyor drive sprocket being so arranged that the complementary faces on the drying form and the forming die move into close proximity and opposed relation as they pass between the same, a drive connection between the cylinder and the sprocket and means associated with the sprocket to pivot the drying form as it approaches the forming die and position the face thereof in substantial parallel aligned relation with the face of the forming die for a predetermined period while they are traveling in close proximity.

These and other objects of the invention will be apparent from the molding mechanism which is shown by way of illustration in the accompanying drawings, wherein:

Fig. 2 is a partial cross section taken generally on the line 2—2 of Fig. 1, with portions broken away and to an enlarged scale;

Fig. 3 is a cross section taken generally on line 3—3 of Fig. 2;

Fig. 4 is a fragmentary cross section taken on the line 4—4 of Fig. 2;

Fig. 5 is a fragmentary cross section taken on the line 5—5 of Fig. 2; and

Figs. 6 to 8 are fragmentary cross-sectional views illustrating the movement of the forming die and drying form as they approach each other.

Figure 1:
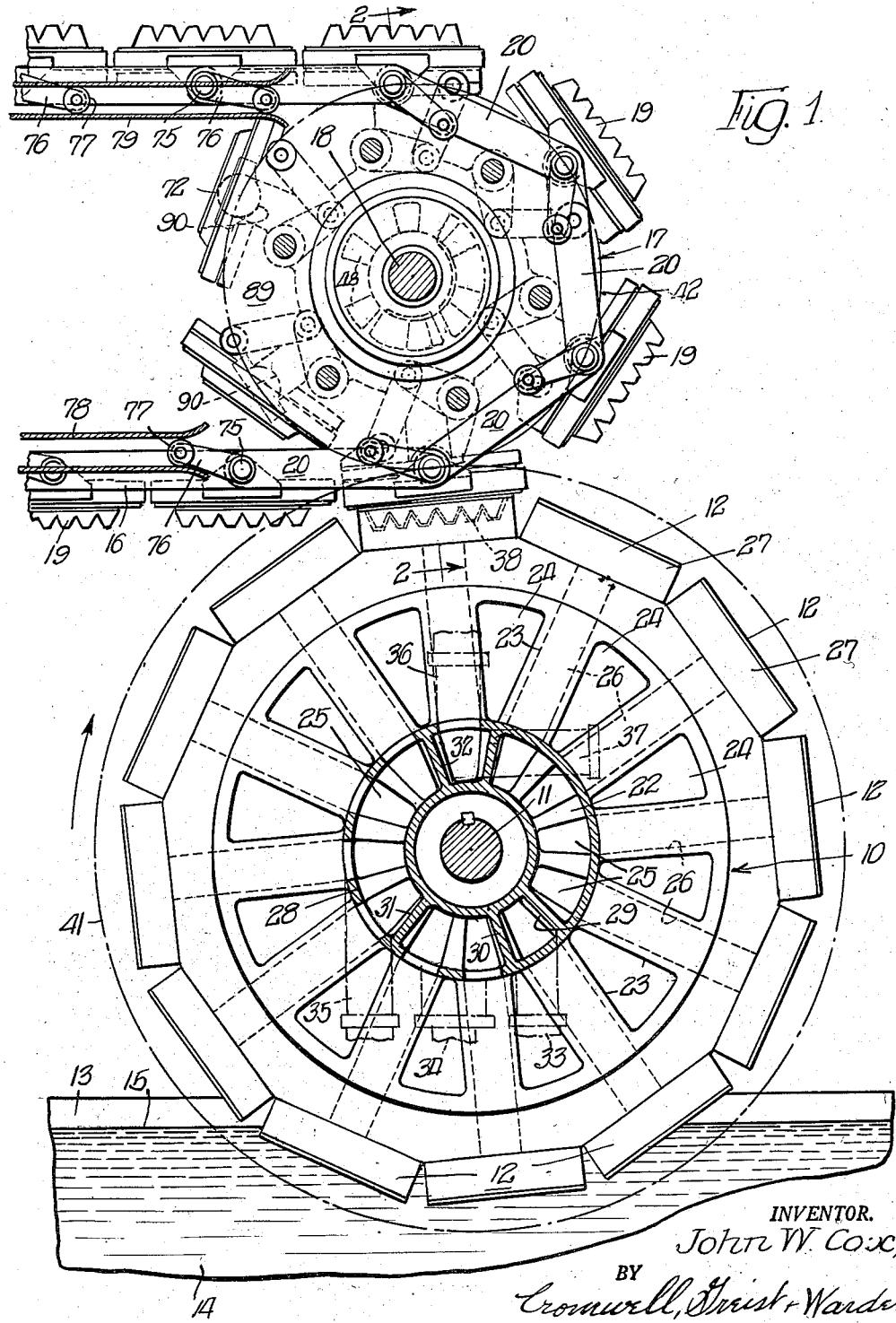
Fig. 1 is a view partly in side elevation and partly in section of a portion of a molding machine which incorporates therein the principal features of the invention.

Referring to the drawings, there is illustrated apparatus forming a portion of a molding machine which incorporates therein various features of the invention and which is particularly adapted for the manufacture of a molded pulp article, such as an egg carton, or a similar article, requiring a forming die having a molding face which is characterized by projecting portions of substantial size separated by relatively deep valleys or recesses. Only that portion of the molding machine is illustrated which has to do with the depositing of the pulp on the molding face of the forming die to form the article and the transfer of the same to a traveling conveyor which transports the article to the drying and finishing apparatus. Since the apparatus for drying and finishing the article forms no part of the present invention it is not illustrated.

The illustrated apparatus comprises a turret or molding cylinder 10 which is rotatably supported on a horizontal shaft or axle 11 and which carries thereon in spaced relation around the periphery thereof a plurality of forming dies 12. The die carrying cylinder or conveyor 10 is arranged for rotating movement about the axis of the shaft 11 directly above the open top of a container or vat 13 which is supplied with a quantity of liquid pulp material 14. The pulp material or slurry 14 comprises pulp fibers in water or other liquid of a consistency which will permit deposit of the pulp fibers in a continuous layer on the outer surface of a foraminous or perforated face of the forming die 12 by suction applied to the interior surface of the molding face. The cylinder 10 is arranged on its shaft above the open container 13 so that, upon rotation of the cylinder 10, the dies 12 have their molding faces immersed in the liquid material 14 as they traverse the lower portion of their path to permit accumulation thereon of a uniform layer of the wet pulp fibers.

The liquid material 14 is maintained at a predetermined level 15 in the container 13 by a supply line (not shown) and the layer of the wet pulp fibers is accumulated on each successive die 12 as the molding face of each die passes through the material 14, the direction of rotation of cylinder 10 being clockwise as indicated by the arrows in Fig. 1.

An endless chain conveyor 16 is supported at one end on a sprocket formation 17 arranged on a shaft 18 which is parallel with the shaft 11 and spaced above the same slightly rearwardly thereof in the direction of rotation of the cylinder 10, so that the lower run of the conveyor 16 passes between the cylinder 10 and the sprocket formation 17 as it moves in a circular path around the sprocket 17. A plurality of drying forms 19 are mounted on the conveyor 16 and extend between oppositely disposed links 20 of the chains which form the side members of the conveyor 16. The drying forms 19 are adapted to receive the still wet and soft layer of pulp forming the molded article from the forming dies 12 on the cylinder 10 and to carry the same around the sprocket formation 17 and over the top run of the conveyor 16 to the drying and finishing apparatus, the molded articles being removed from the machine when the drying and finishing operations are completed.

The shaft 11 supporting the molding or forming cylinder 10 is mounted in end bearings (not shown) in laterally spaced side plates 21 (Fig. 2) forming portions of the supporting frame for the molding end of the machine. The cylinder 10 may be made in sections, for convenience in assembling, with the sections aligned axially of the shaft 11, forming, in effect, a unitary cylinder which comprises a hub-like portion 22 (Fig. 1) keyed to the shaft 11 and radially extending spoke formations 23 projecting therefrom which are separated by web portions 24. The hub portion 22 is provided with a plurality of axially extending internal passageways 25 which are in communication with passageways 26 in the spoke formations 23, the latter extending to the box-like formations 27 which form part of the dies 12. The axially extending passageways 25 are open at the ends of the cylinder 10, each cylinder end being in engagement with the inner wall of a fixed suction box 28, shown in section in Fig. 1. The suction box 28 is divided into compartments 29, 30, 31 and 32 and the end plate of the box is provided with corresponding apertures or ports which communicate with the axial passageways 25 leading to the respective dies 12. The compartments 29, 30 and 31 are arranged, as required, to accumulate on the molding face of the dies 12 a layer of the pulp fibers during the time when the dies 12 pass through the material 14 and to withdraw the liquid therefrom as the dies move to the uppermost position. The blowoff compartment 32 is arranged at the top of the cylinder 10 so that the pulp articles are blown off the molding faces for transfer to the drying forms 19 at the proper time. The compartments 29, 30, 31 and 32 are connected to suitable suction and blowoff lines as indicated at 33, 34, 35 and 36 (Fig. 1) and a drainage line is provided at 37.

Each of the dies 12 comprises the outwardly facing box 27 and a perforated or foraminous screen 38 (Figs. 5 to 8) arranged over the open face of the box 27 and contoured to conform to the shape of the article to be molded which, in the case of an egg carton, results in outward projections of substantial size 39 separated by recesses 40 of substantial depth.

A plurality of groups of the dies 12 are arranged around the periphery of the cylinder 10 (Fig. 1) which forms a conveyor therefor and each group of the dies 12 (Fig. 2) comprises a plurality of the screens 38 arranged in axially spaced relation on the opposite sides of the center line of the cylinder 10.

The cylinder 10 is adapted to be driven by a gear 41 (Fig. 2) which meshes with a driving gear 42 on the shaft 18 of the sprocket 17 so that the cylinder 10 and the sprocket 17 may be adjusted to rotate in synchronized relation for proper alignment of the forming dies 12 and drying forms 19.

The sprocket formation 17 comprises a plurality of sections arranged in symmetrical relation about a center line, extending transversely of the axis of the shaft 18, as shown in Fig. 2. Each half of the sprocket 17 includes a central section 43 having a hub-like portion 44 which is provided with axially extending, peripherally spaced passageways 45. Adjacent the outer end of the center section 43 there is arranged an end section 46 having a hub portion 47 provided with a plurality of passageways 48 in alignment with the axially extending passageways 45 in the center section 43 and a plurality of spoke formations 49 which extend in a generally radial direction from the hub formation 47 and which have an internal passageway 50 communicating with a passageway 48 in the hub 47 thereof and terminating at the outer end in an axially extending opening or bore 51 which is adapted to receive an end 52 of a hollow pivot forming member 53, the internal passageway 54 of the same being in communication with the passageway 50 in the spoke formation 49.

At the other end of the center section 43 there is a section 55, similar to the end section 46, having a hub portion 56 which is provided with peripherally spaced, axially extending passageways 57 and radially extending spoke formations 58 having a passageway 59 on the interior thereof in communication with a passageway 57 in the hub 56 and extending to a lateral bore 60 which receives the other end 61 of the hollow pivot bar 53.

Each pivot bar 53 carries a suction box formation 62 mounted thereon by means of bearing formations 63 arranged at opposite ends of the hollow shaft 53 and fixed to the wall member 64 forming the base of the suction box 62. Suitable communicating apertures 65 and 66 are provided in the pivot tube 53 and the bearing formations 63 to provide communication from the tube 53 through the bearing members 63 to the opposite face of the base plate or suction box wall member 64. The wall member 64 is provided with an outwardly-facing flange formation 67 at the edges thereof which carries a gasket member 68 adapted to bear against the margin or flange 69 on a transversely extending drying frame 70 which carries a plurality of the drying forms 19 arranged to correspond with the arrangement of the forming dies 12 across the cylinder 10. The frame 70 is perforated to provide communication with the back of each drying form 19. Each drying form 19 consists of a screen or perforated plate member 71 which is contoured so that it is complementary to the molding screen 38 on the die 12 and which is provided with outwardly extending projections 72 of substantial size which are separated by recesses 73 of substantial depth. The drying frames 70 are each provided at opposite ends with bracket plates 74 which are secured to pivot pins 75 connecting the links 20 of the chain 16.

A cam arm 76 and cam roller 77 are provided on the outer end of each pivot pin 75 for engagement with guide channels 78 and 79 (Fig. 1) extending along the lower and upper runs of the conveyor 16, so as to hold the drying frames 70 in horizontal position while they are traveling over the straight portions of the conveyor 16.

The suction boxes 62 mounted on the pivot tube 53 by means of the bearing formations 63 are controlled for swinging movement by a link 80 which is connected at one end to ears 81 extending from the box 62 and at the other end to a crank arm 82 mounted on a cam shaft 83, which extends parallel with the shaft 18 and which is supported in bearing formations 84, 85 in the end and center body sections 46 and 55 of the sprocket formation.

At its ends the cam shaft 83 is provided with a crank arm 86 (Fig. 3) having a cam roller 87 on the outer end thereof which travels in a generally circular cam track 88, and which controls the pivotal movement of the suction boxes 62 to bring them into communicating relation with the open rear face of the drying frames 70 as the latter approach and begin their movement around the periphery of the sprocket formation 17. The sprocket formation 17 is provided with end plates 89 provided with suitable recesses 90 for receiving the pivots 75 connecting the links 20 of the side chain members.

The end section 46 of the sprocket formation 17 abuts against the inner wall 91 of a fixed end suction box 92 at the end of the shaft 18 which is provided with a central bearing sleeve 93 for receiving the shaft 18. The end plate 89 of the sprocket body includes a channel shape formation 94 adapted to receive a radially extending flange 95 on the inner wall plate 91 of the suction box 92. The suction box 92 is partitioned to form internal compartments 96 and 97 which are connected to suction lines 98 and 99. The inner wall plate 91 is provided with ports 100 and 101 to provide communication with the passageways 45, 48, 57 in the body of the sprocket and enable suction to be applied to the molded articles as they are received on the forms 19 and carried around the sprocket to the top run where the pivoted suction boxes 62 separate from the cross frames 70 carrying the forms 19.

The cam track 88 is arranged so that, as each cross frame 70 approaches the sprocket formation 17 a suction box 62 is swung into engagement with the back or inner side of the carrying frame 70 and the latter is swung relative to the path of travel of the chain to bring it into parallel relation with the face of a form 12 on the molding cylinder 10 and to maintain it in parallel relation therewith while the two move toward each other and pass through a radial line connecting the centers of rotation of the shafts 11 and 18 and to a point somewhat beyond the connecting line, sufficient to allow for the transfer of the molded articles from the forming screens to the drying forms. The shaft 18 and the associated drying form conveyor structure 16 is arranged relative to the shaft 11 and the molding die cylinder or conveyor 10 so that the drying frames on the conveyor 16 move in a path having a portion thereof extending in a plane parallel and slightly spaced from a succession of planes which are tangential to a curved portion of the path of the cylinder 10. The suction box 62 is tilted so that approach and separation of the complementary faces occurs with the same in nearly parallel relation, thus avoiding any interference between the projecting members or portions on the same while they are in close proximity to each other.

The drying frames 70 which carry the forms 19 are pivotally mounted preferably at the pivot points connecting the chain links. However, the frames 70 may be mounted at some other point along the length of the chain links with suitable changes in the cam operating mechanism.

While specific details of construction have been referred to in describing the illustrated form of the invention, it will be understood that other details of construction may be resorted to within the spirit of the invention.

I claim:

1. A pulp molding machine comprising a container for a supply of liquid pulp material, a conveyor having a plurality of forming die members mounted thereon, each of said die members having a perforated molding face and controlled suction means applied to the interior thereof, means for operating said conveyor continuously at a uniform speed to move the successive dye members continuously in a curved path which extends into said container and which holds the molding faces thereof below the level of the liquid pulp material throughout a predetermined portion of the movement of the die members to permit a layer of pulp to be deposited thereon by said suction means, a second conveyor having a plurality of drying frames mounted thereon, said drying frames having die members provided with faces which are complementary to the face of the pulp on the forming die members, means for operating said conveyor continuously and at a uniform speed, said second conveyor being positioned relative to said first conveyor to move said drying frames continuously in a predetermined path with a portion of said path extending in a plane parallel and slightly spaced from a succession of planes which are tangential to a curved portion of the path of the first conveyor, said drying frames being pivotally mounted on said second conveyor for movement relative to the path of movement of said first conveyor and means independent of said first conveyor and said forming die members for pivotally moving said drying frames relative to the path of movement of said forming die members to bring the complementary faces of successive pairs of die members on the respective conveyors into spaced parallelism and alignment for a relatively short portion of their movement sufficient to permit transfer of the molded pulp layer from the molding die face to the drying die face during continuous advancing movement of said conveyors.

2. In apparatus for molding pulp articles, a container having a supply of liquid pulp material therein, a rotatably mounted turret above said container, a molding member having a molding face mounted on said turret so that upon rotation of the turret said molding face is moved through the liquid pulp material, means for depositing a layer of the wet pulp on said molding face as it moves through the liquid pulp material, an endless conveyor having one end supported on a rotatable drum-like member mounted in fixed relation above said turret, a drying form member mounted on said endless conveyor and movable relative to said conveyor, said drying form member having a face which is complementary to said molding face, said turret and said conveyor end support member being positioned in fixed spaced relation to each other so that the complementary faces of the molding member and the drying form member are brought into close proximity upon predetermined movement of said turret and said conveyor, means for operating said turret and said conveyor continuously, and means for moving said drying form member on said conveyor transversely of the path of movement of the conveyor as it approaches said end support member into close proximity with the molding die and thereafter moves upwardly about said end support member to an upper return run and away from the molding die whereby said complementary faces are brought into spaced, parallel and aligned relation for a predetermined period of time sufficient to effect transfer of the layer of wet pulp from the molding die to the drying form without interrupting the advancing movement of either the molding die or the drying form.

3. In apparatus for molding pulp articles, a container having means for supplying the same with a liquid pulp material at a predetermined level, a rotatably mounted turret above said container, forming die members having molding faces mounted on said turret so that upon rotation of the turret the molding faces are moved through the liquid pulp material, means for depositing a layer of the wet pulp on each of said molding faces as they move through the liquid pulp material, an endless conveyor having one end supported on a member which is mounted for rotation about a fixed axis above said turret, drying form members on said endless conveyor, said drying form members having faces which are complementary to said molding faces, the axis of rotation of said turret and said conveyor end support member being arranged in fixed spaced relation so that the forming die members and the drying form members travel independently in separate paths which have a portion thereof extending between said turret and said conveyor end support member in close proximity, said drying form members approaching the path of said turret at the up-permost limits thereof and then moving away from the same upwardly around said conveyor end supporting member, and means for moving said drying form members relative to the normal path of movement of the conveyor to bring the faces of the drying form members into close proximity and spaced, parallel registry with the molding faces to permit transfer of the wet pulp articles from the forming die members to the drying form members during the parallel movement thereof.

4. In apparatus for molding pulp articles wherein molding members each having a foraminous molding face are arranged on a turret rotatably mounted above a container filled with a liquid pulp material so that upon rotation of the turret the molding faces are moved through the liquid pulp material to deposit thereon a layer of the wet pulp, an endless conveyor having one end supported on a rotatable drum-like sprocket member mounted for rotation on a fixed axis spaced above said turret, drying form members on said endless conveyor, said drying form members having faces which are complementary to the said molding faces, said conveyor sprocket member being so arranged relative to said turret that the drying form members travel in a path which extends from a lower run approaching said turret upwardly around said sprocket to an upper return run annd which has a portion thereof extending between said turret and said conveyor sprocket in close proximity to the circular path of the molding members, means for operating said turret and said conveyor continuously and at uniform speed, and means on said sprocket for engaging with said drying form members as they travel around the same to shift the faces of said drying form members relative to the normal path of movement of said drying form members and bring the same into closely spaced, parallel register with the complementary faces of successive molding members to permit transfer of the layers of wet pulp from the molding members to the drying form members during continuous parallel spaced movement thereof.

5. In apparatus for molding pulp articles wherein a molding member having a foraminous molding face is mounted on a continuously rotating turret so that the molding face is moved through a liquid pulp material in a container positioned below said turret and a layer of the wet pulp is deposited on said molding face, and wherein a drying form is movably supported on an endless conveyor having at one end a continuously rotating sprocket positioned above said turret, said turret and said sprocket being mounted on spaced parallel shafts which are in fixed relation to each other, said drying form having an outer face which is complementary to the molding face of said molding member, interengaging means on said sprocket and said drying form for moving the drying form out of its normal position relative to the conveyor as the conveyor advances to and moves around said sprocket, said means being operative to align said drying form with the outer face thereof in close proximity to the molding face of said molding member and to cause said drying form face to move toward said molding face in parallel relation thereto while said drying form and said molding member pass through a radial line connecting the centers of rotation of said shafts during which the layer of wet pulp is transferred from the molding member to the drying form member.

6. A molding machine comprising a rotatably mounted cylinder, a plurality of forming dies mounted in spaced relation around the periphery of the cylinder, a container having therein a supply of liquid pulp material, said dies moving through the pulp material while traveling in a portion of their rotational path, means associated with the dies to deposit on the outer face thereof a layer of wet pulp fibers as they pass through the liquid material, a conveyor comprising laterally spaced endless link chains, a plurality of drying forms pivotally supported between opposed links of said conveyor chains, said drying forms having outer faces complementary to the outer faces of the forming dies, a sprocket formation rotatably mounted above said cylinder and supporting one end of said conveyor chains, means for driving said sprocket formation and said cylinder in timed relation to align the drying forms on the conveyor with successive dies on the cylinder, means mounted on the sprocket formation for movement relative to the same and into engagement with the inner faces of successive drying forms to connect the same with a suction line as the drying forms move around the sprocket, and a cam arrangement for controlling the movement of said means and the associated drying forms whereby to bring the outer faces of the drying forms into parallel relation to the outer faces of the forming dies when they are in alignment between the cylinder and the sprocket.

7. In a pulp molding machine, a container having a supply of liquid pulp material therein, a continuously rotating cylinder mounted above said container, a forming die having a molding face mounted in fixed relation on said cylinder, a conveyor having one end supported on a sprocket which is mounted for continuous rotation on a fixed axis located in spaced relation above said cylinder, a drying frame on said conveyor having a face complementary to said molding face, means for rotating said cylinder and said sprocket in timed relation to bring said forming die and said drying frame into opposed relation and means on said sprocket for engaging said drying frame to pivot said drying frame relative to said conveyor and out of its normal path of movement to bring the face thereof into a plane generally parallel to the molding face on said forming die as said drying frame and forming die are rotated in opposed spaced relation.

8. In a pulp molding machine, a container having a supply of liquid pulp material therein, a continuously rotating cylinder mounted above said container, a forming die having a molding face mounted in fixed relation on said cylinder, an endless conveyor having one end mounted on a drive sprocket which is supported on an axis in fixed spaced relation immediately above said cylinder, a drying frame pivoted on said conveyor and having a face complementary to said molding face, means for continuously rotating said cylinder, means for continuously rotating said drive sprocket in synchronism with said cylinder to bring said drying frame and said forming die into opposed relation, and cam controlled means on said sprocket for engaging said drying frame to tilt the same out of its normal path of movement and bring the face thereof into a plane which is in generally parallel closely spaced relation to the plane of the molding face on said forming die as the frame and die pass through a radial line connecting the centers of rotation of the cylinder and the drive sprocket.

9. A molding machine comprising a rotatably mounted cylinder, a plurality of forming dies mounted in spaced relation around the periphery of the cylinder, a container having therein a supply of liquid pulp material, said dies moving into said container and through the pulp material at the bottom of their rotational path, means associated with the dies to deposit on the molding face thereof a layer of the pulp as they pass through the liquid material, an endless conveyor characterized by chain links and connecting pivot members, a plurality of drying forms pivotally supported on the pivot members connecting the links of the conveyor, said drying forms having outer faces adapted to mate with the molding faces of the forming dies, a sprocket rotatably mounted above said cylinder and supporting one end of said conveyor, means for driving said sprocket and said cylinder in timed relation to align the drying forms on the conveyor with successive dies on the cylinder, suction boxes pivotally mounted around the periphery of the sprocket and adapted to engage the inner face of each drying form to connect the same with a suction line as the drying forms move around the sprocket, a cam associated with each suction box and a fixed cam track controlling the pivotal movement of the suction boxes whereby to tilt the outer faces of the drying forms into parallel relation to the molding faces of the forming dies when they move into and out of alignment as they pass between the cylinder and the sprocket.

10. A molding machine comprising a rotatably mounted cylinder, a plurality of forming dies mounted in spaced relation around the periphery of the cylinder, a container having therein a supply of liquid pulp material, said dies moving into said container and through the pulp material at the bottom of their rotational path, means associated with the dies to deposit on the outer face thereof a layer of the pulp as they pass through the liquid material, an endless link chain conveyor, a plurality of drying forms pivotally supported on the links of the conveyor, said drying forms having outer faces complementary to the outer faces of the forming dies, a sprocket rotatably mounted above said cylinder and supporting one end of said conveyor, means for driving said sprocket and said cylinder in timed relation to align the drying forms on the conveyor with successive dies on the cylinder, suction boxes pivotally mounted on the sprocket and arranged to move into engagement with the inner face of each drying form to connect the same with a suction line as the drying forms move around the sprocket, cam arms and rollers associated with each suction box and a fixed cam track controlling the pivotal movement of the suction boxes whereby to bring the outer faces of the drying forms into parallel relation to the outer faces of the forming dies when they are in alignment between the cylinder and the sprocket.

11. A molding machine comprising a rotatably mounted cylinder, a plurality of forming dies mounted in spaced relation around the periphery of the cylinder, a container having therein a supply of liquid pulp material, said dies moving into said container and through the pulp material at the bottom of their rotational path, means associated with the dies to deposit on the molding face thereof a layer of the pulp as they pass through the liquid material, an endless conveyor characterized by links joined by pivotal connections, a plurality of drying forms pivotally supported on the pivotal connections between the links of the conveyor, said drying forms having outer faces adapted to mate with the molding faces of said dies, a sprocket rotatably mounted above said cylinder and supporting one end of said conveyor, means for driving said sprocket and said cylinder in timed relation to align the drying forms on the conveyor with successive dies on the cylinder, suction boxes pivotally mounted around the periphery of the sprocket and adapted to move into engagement with the inner face of each drying form to connect the same with a suction line as the drying forms move around the sprocket, cam arms and rollers associated with each suction box, a fixed cam track adjacent said sprocket controlling the pivotal movement of the suction boxes whereby to bring the faces of the drying forms into parallel relation to the faces of the forming dies when they are moving between the cylinder and the sprocket, and means to control the pivoting of the drying forms along the remainder of the conveyor.

12. A rotatably mounted cylinder, forming dies mounted around the periphery of said cylinder, means cooperating with said cylinder to deposit on each die a layer of wet pulp forming an article thereon, a continuous link chain conveyor, a rotatably mounted sprocket supporting one end of said conveyor for movement above said cylinder, drying forms pivotally supported on the links of said conveyor, suction boxes for cooperating with successive drying forms to apply suction thereto, said suction boxes being pivotally connected to said sprocket and adapted to engage in suction applying relation with successive drying forms as the links on which said drying forms are supported advance along the lower run of said conveyor into engagement with said sprocket and move upwardly around the same to the upper return run of said conveyor, means to rotate said cylinder and said sprocket in synchronized relation whereby to bring successive drying forms into opposed relation with the forming dies and means on said sprocket to pivot said suction boxes relative to said sprocket and in timed relation to the movement of said drying forms to bring them into suction applying engagement with successive drying forms as said drying forms advance to and move around said sprocket and thereafter to pivot each suction box and drying form as a unit out of the normal path of movement of the conveyor and bring the face of the drying form into parallel relation with the face of a forming die for a predetermined portion of the movement thereof.

13. A molding machine comprising a rotatably mounted cylinder, a plurality of forming dies mounted in spaced relation around the periphery of the cylinder, a container having therein a supply of liquid pulp material, said dies moving through the pulp material while traveling in a portion of their rotational path, means associated with the dies to deposit on the outer face thereof a layer of wet pulp fibers as they pass through the liquid material, a conveyor comprising laterally spaced endless link chains, a plurality of drying forms pivotally supported between opposed links of said conveyor chains, said drying forms having outer faces complementary to the outer faces of the forming dies, a sprocket formation rotatably mounted above said cylinder and supporting one end of said conveyor chains, means for driving said sprocket formation and said cylinder in timed relation to align the drying forms on the conveyor with successive dies on the cylinder, suction boxes mounted on the sprocket formation for movement relative to the same into engagement with the inner faces of successive drying forms to connect the same with a suction line as the drying forms move around the sprocket, and cam means associated with said suction boxes and including a fixed cam track for controlling the movement of each suction box and its associated drying form whereby to bring the outer faces of the drying forms into parallel relation to the outer faces of the forming dies when they are in alignment between the cylinder and the sprocket.

14. In a pulp molding machine, a container having a supply of liquid pulp material therein at a predetermined level, a cylinder rotatably mounted above said container, a forming die having a molding face mounted in fixed relation on said cylinder, an endless chain conveyor having one end thereof mounted on a drive sprocket positioned above and in close proximity to said cylinder, said drive sprocket and said cyinder being mounted for rotation about axes which are in non-movable relation to each other, a drying frame pivoted on the chains of said conveyor and having a face complementary to said molding face, means for continuously rotating said cylinder and said drive sprocket in synchronism to bring said drying frame and said forming die into opposed relation and cam means associated with said sprocket and said drying frame which is operative to pivot the drying frame relative to the sprocket as it passes around the same and bring the complementary faces of the drying frame and molding die into spaced generally parallel planes as the frame and die pass through a radial line connecting the centers of rotation of the cylinder and the drive sprocket.

15. In a pulp molding machine, a container having a supply of liquid pulp material therein at a predetermined level, a continuously rotating cylinder mounted above said container, a series of forming dies having molding faces mounted in fixed relation on said cylinder, an elongate endless chain conveyor having one end thereof mounted on a drive sprocket positioned above said cylinder, a series of drying frames pivotally mounted on the chains of said conveyor, each of said frames having a series of drying forms, each of said forms having a face complementary to the molding faces on the forming dies, means for rotating said cylinder and said drive sprocket continuously and in synchronism to bring said drying frames successively into opposed relation with successive forming dies, means including a cam mechanism associated with said sprocket for engaging the drying frames to pivot the same out of the normal path of movement of the conveyor around the drive sprocket and bring the faces of the forms thereon into a plane generally parallel to the molding faces on the forming dies as the frames and dies pass between the cylinder and the drive sprocket, and cam means associated with said conveyor and said drying frames to guide the same to and from the drive sprocket end of the conveyor.

References Cited in the file of this patent

UNITED STATES PATENTS

| | | |
|---|---|---|
| 558,676 | Cunningham et al. | Apr. 21, 1896 |
| 959,928 | Gentle | May 31, 1910 |
| 969,540 | Komarek | Sept. 6, 1910 |
| 1,391,973 | Phillips | Sept. 27, 1921 |
| 1,618,289 | Koppelman | Feb. 22, 1927 |
| 1,719,819 | Koppelman | July 2, 1929 |
| 1,956,975 | Belcher | May 1, 1934 |
| 1,967,361 | Healy | July 24, 1934 |
| 2,559,945 | Chaplin | July 10, 1951 |